(12) United States Patent
Handa et al.

(10) Patent No.: US 7,266,521 B1
(45) Date of Patent: Sep. 4, 2007

(54) METHOD AND SYSTEM OF MANAGING MUTUAL EARLY TERMINATION TERMS FOR THE ELECTRONIC TRADING OF FINANCIAL INSTRUMENTS

(75) Inventors: Michiya Handa, New York, NY (US);
Michael J. Tari, New York, NY (US);
Darius Gagne, New York, NY (US);
Neil Chriss, New York, NY (US);
Jeffery Larsen, Greenwich, CT (US)

(73) Assignee: ICOR Brokerage, Inc., New York, NY (US)

( * ) Notice: Subject to any disclaimer, the term of this patent is extended or adjusted under 35 U.S.C. 154(b) by 911 days.

(21) Appl. No.: 09/692,029

(22) Filed: Oct. 19, 2000

Related U.S. Application Data

(63) Continuation-in-part of application No. 09/665,305, filed on Sep. 19, 2000, now Pat. No. 7,110,972.

(51) Int. Cl.
*G06Q 40/00* (2006.01)
(52) U.S. Cl. ............... 705/37; 705/35; 705/36; 705/38
(58) Field of Classification Search .......... 705/35, 705/36, 37, 38, 26, 27
See application file for complete search history.

(56) References Cited

U.S. PATENT DOCUMENTS

| | | |
|---|---|---|
| 3,573,747 A | 4/1971 | Adams et al. |
| 4,412,287 A | 10/1983 | Braddock, III |
| 4,486,853 A | 12/1984 | Parsons |
| 4,554,418 A | 11/1985 | Toy |
| 4,674,044 A | 6/1987 | Kalmus et al. |
| 4,677,552 A | 6/1987 | Sibley, Jr. |
| 4,942,616 A | 7/1990 | Linstroth et al. |

(Continued)

FOREIGN PATENT DOCUMENTS

EP 0411748 A2 2/1991

(Continued)

OTHER PUBLICATIONS

Schmerken, Ivy, *Banks Eye Forex Matching Systems*, Wall Street Computer Review, vol. 9, No. 2, pp. 45-46 and 49-51, Nov. 1991.

(Continued)

*Primary Examiner*—Nga Nguyen
(74) *Attorney, Agent, or Firm*—Skadden, Arps, Slate, Meagher & Flom LLP

(57) ABSTRACT

A method and system for tracking and enforcing mutual put, i.e. early termination, requirements for contracts between a first financial institution and a second financial institution for underlying financial instruments is disclosed. The mutual puts comprise an option to unwind the underlying financial instrument at a future time. One embodiment of the system includes storing a plurality of sets of mutual put requirements for a plurality of trading parties, each set of mutual put requirements established by a first party for trades with a counterparty; receiving a trade indication identifying a pair of trading parties; retrieving the mutual put requirements for each of the counterparties; and calculating a set of mutual put parameters for the trade based on the stored bilateral mutual put requirements. The system may further verify that the trade entered into between the parties meets the calculated set of mutual put parameters.

18 Claims, 14 Drawing Sheets

U.S. PATENT DOCUMENTS

| | | | |
|---|---|---|---|
| 4,980,826 | A | 12/1990 | Wagner |
| 5,038,284 | A | 8/1991 | Kramer |
| 5,077,665 | A | 12/1991 | Silverman et al. |
| 5,101,353 | A | 3/1992 | Lupien et al. |
| 5,136,501 | A | 8/1992 | Silverman |
| 5,214,579 | A | 5/1993 | Wolfberg et al. |
| 5,297,031 | A | 3/1994 | Gutterman et al. |
| 5,375,055 | A | 12/1994 | Togher et al. |
| 5,655,088 | A | 8/1997 | Midorikawa et al. |
| 5,689,652 | A | 11/1997 | Lupien et al. |
| 5,717,989 | A | 2/1998 | Tozzoli et al. |
| 5,724,524 | A | 3/1998 | Hunt et al. |
| 5,727,165 | A | 3/1998 | Ordish et al. |
| 5,774,880 | A | 6/1998 | Ginsberg |
| 5,802,499 | A | 9/1998 | Sampson et al. |
| 5,809,483 | A | 9/1998 | Broka et al. |
| 5,857,176 | A | 1/1999 | Ginsberg |
| 5,873,071 | A | 2/1999 | Ferrstenberg et al. |
| 5,905,974 | A | 5/1999 | Fraser et al. |
| 5,905,975 | A | 5/1999 | Ausubel |
| 5,915,209 | A | 6/1999 | Lawrence |
| 5,924,082 | A | 7/1999 | Silverman et al. |
| 5,924,083 | A * | 7/1999 | Silverman et al. ............ 705/37 |
| 5,950,177 | A | 9/1999 | Lupien |
| 5,963,923 | A | 10/1999 | Garber |
| 5,983,200 | A | 11/1999 | Slotznick |
| 5,987,419 | A | 11/1999 | Hachino et al. |
| 6,012,046 | A | 1/2000 | Lupien et al. |
| 6,014,627 | A | 1/2000 | Togher et al. |
| 6,014,643 | A | 1/2000 | Minton |
| 6,014,644 | A | 1/2000 | Erickson |
| 6,016,483 | A | 1/2000 | Rickard et al. |
| 6,026,383 | A | 2/2000 | Ausubel |
| 6,035,287 | A | 3/2000 | Stallaert et al. |
| 6,055,519 | A | 4/2000 | Kennedy et al. |
| 6,058,379 | A | 5/2000 | Odom et al. |
| 6,119,101 | A | 9/2000 | Peckover |
| 6,131,087 | A | 10/2000 | Luke et al. |
| 6,151,588 | A | 11/2000 | Tozzoli et al. |
| 6,317,727 | B1 | 11/2001 | May |
| 6,519,574 | B1 * | 2/2003 | Wilton et al. ................. 705/35 |
| 2002/0002530 | A1 | 1/2002 | May |

FOREIGN PATENT DOCUMENTS

| | | |
|---|---|---|
| EP | 0512702 A2 | 11/1992 |
| EP | 0407026 B1 | 11/1995 |
| EP | 0399850 B1 | 12/1995 |
| WO | WO99/19821 | 4/1999 |

OTHER PUBLICATIONS

Wilson, John F., *On-Line International Cash Management*, Annual ACM Conference, 1983.

Burman, Michael, *Aspects of a High-Volume Production Online Banking System*, IEEE Compcon, Spring of 1985.

Sammer, Harald W., *Online Stock Trading Systems: Study of an Appliication*, IEEE Compcon, Spring of 1987.

Clemons, E.K., et al., *Merrill Lynch Cash Management Account Financial Service: A Case Study in Strategic Information Systems*, 21st Annual Hawaii International Conference on Systems Sciences, vol. 4, 1988.

Finebaum, Murray L., *Information Systems in the Securities Industry*, 21st Annual Hawaii International Conference on System Sciences, vol. 4, 1988.

Sager, M.T., *Competitive Alliances With Information Technology—The Australian Retail Banking Experience*, 22nd Annual Hawaii International Conference on System Sciences, vol. 4, 1989.

Gutner, Tammi, *Fine If You're Big*, The Banker, Oct. 1988.

Arend, Mark, *Swift Speeds Up Broker/Dealers Join*, Wall Street Computer Review, Jan. 1989.

Essinger, James, *ISE's 'SAEF' Debuts to Make the Market Sound*, Wall Street Computer Review, May 1989.

Freund, William C., *Electronic Trading and Linkages in International Equity Markets*, Financial Analysis Journal, May-Jun. 1989.

Schmerken, Ivy, *High-Tech Banks Set to Challenge Wall Street*, Wall Street Computer Review, Jul. 1989.

Arend, Mark, *Where Wall Street's Tending In Trading Systems Design*, Wall Street Computer, Jun. 1990.

Arend, Mark, *Banks Lure Investors With High-tech Convenience*, Well Street Computer Review, Dec. 1989.

Brennan, P.J., *OTC Trading Systems Lead In Race to Automate*, Wall Street Computer Review, Nov. 1990.

Cody, B.J., *Reducing the Costs and Risks of Trading Foreign Exchange*, Wall Street Computer Review, Nov. 1990.

Goodman, Ann, *The Monep: Mixing Men and Machines for Market Might*, Wall Street Computer Review, Aug. 1991.

Heymann, D.P., *A Performance Model of the Credit Manager Algorithm*, Computer Networks and ISDN Systems, Mar. 1992.

*Method For Collection of Accounting Data*, IBM Technical Disclosure Bulletin, 1986.

Banks Look to Build FX Oder-Matching System Quotron Eyed as Vendor, Minex as Co-Sponsor?, FX Week, May 17, 1991.

*TST Interviews Evan Schulman*, Automated Trading Pioneer, Trading Systems Technology, Jul. 15, 1991.

Schmerken, Ivy, *Staying in the Middle: . . . Brokers Are Fighting to Keep Their Role in the Market: Includes Related Article on Crossing Networks*, Wall Street Computer Review, Dec. 1991.

Jeffries, *AZX, Others Team With Buy-Side Software System*, Wall Street Letter, Jun. 8, 1992.

*Proprietary Execution: Minex Secures Asian Support for Order-Matching System*, Trading Systems Technology, Jan. 27, 1992.

*Proprietary Execution: Quotron, EBS Demo Prototype of Forex Order-Matching System*, Trading Systems Technology, Nov. 4, 1991.

*Eleven Banks, Quotron Unveil EBS Demo Anonymous Forex Order-Matching System*, FX Week, Nov. 1, 1991.

Keith, C., *The Overview Revolution: Equity Trading in the Post-Electronic Age: A Working Plan for a Customer-Based System*, Investment Dealer's Digest, Sep. 30, 1991.

Fingelton, E., *Tokyo Takes on Reuters in the Race to Wire the Forex World*, International Japan Journal, p. 35, Dec 1990.

Arend, M., *New Systems Lighten Load on Bank Securities Wings; Warrington Financial Systems' Broker-Dealer Module for the firm's Bond On-Line Trading System meets needs of Section 20 subsidiaries of banks*, Wall Street Computer Review, Nov. 1990.

*VAX-11 Version of "IBIS" Release by Tymshare*, Computer World, May 9, 1983.

Capitol Hill Hearing Testimony, Shawn A. Dorsch, Pres. & CEO of Derivatives Net, Inc., Senate Banking, Housing & Urban Affairs Changing Financial Markets, May 8, 2000.

Perkins, Fred J., *Nordex: Automated Trading for Nordic Equities*, Computers in the City '89, London, Nov. 1989.

Money Match: Functional Specification, Version 1, Aug. 1990.

LIFFE User Manual, How the Market Works, 3rd Edition—Feb. 2000.

2000 ISDA Definitions, International Swaps and Derivatives Association, Inc., pp. 24-25.

* cited by examiner

Druid USD Swaps and Options Properties

150  152  154
Draw-Down | Eligibility | Customize

— Common Settings —

Re-apply Previous Settings for all Entities | Create Same Buckets for all Entities Please specify the Draw-Down Proportions:

|  | 2Yr | 5Yr | 7Yr | 10Yr |
|---|---|---|---|---|
| | 140 | 142 | 144 | 146 |
| USD Swap (130) | 1600 = | 1000 = | 800 = | 500 |
| USD Swaption (132) | 1200 = | 900 = | 700 = | 350 |
| USD Cap/Floor (134) | 1500 = | 800 = | 400 = | 200 |

128

OK    Cancel

Druid USD Swaps and Options Properties 150  152  154

[Draw-Down] [Eligibility] [Customize]

| Legal Entity 162 | Eligibility 164 | Available Credit (MM) (multiplies Draw-Down Proportions) 166 |
|---|---|---|
| Merrill Lynch Capital Services | ☒Yes ☐No | 1.0 |
| Morgan Guarantee Trust | ☒Yes ☐No | 2.0 |
| Morgan Stanley Capital Services | ☒Yes ☐No | |
| Salomon Brothers Holding Co. | ☒Yes ☐No | 1.5 |
| Goldman Sachs Capital Markets | ☒Yes ☐No | 2.3 |
| Bank of America | ☒Yes ☐No | 1.5 |
| Salomon Brothers Holding Co. | ☒Yes ☐No | 2.3 |
| Lehman Brothers Special Financing | ☒Yes ☐No | 1.5 |
| National Westminster Bank | ☒Yes ☐No | 2.3 |
| BNP Paribas | ☒Yes ☐No | |
| ABN-Amro NV | ☒Yes ☐No | 2.3 |
| Deutche Bank | ☒Yes ☐No | 1.5 |
| Bank of New York | ☒Yes ☐No | 2.3 |
| Merrill Lynch Capital Services | ☒Yes ☐No | 2.3 |

160

[OK]  [Cancel]

Druid USD Swaps and Options Properties

Draw-Down | Eligibility | Customize
150    152    154

| Legal Entity 162 | Eligibility 164 | Available Credit (MM) (multiplies Draw-Down Proportions) 402 | Early Termination 400 Start Period (Years) 404 | (Years) 406 |
|---|---|---|---|---|
| Merrill Lynch Capital Services | ⊙Yes ○No | 1.0 | 1.0 | 5 |
| Morgan Guarantee Trust | ⊙Yes ○No | 2.0 | 2.0 | 5 |
| Morgan Stanley Capital Services | ○Yes ⊙No | | | |
| Salomon Brother Holding Co. | ⊙Yes ○No | 1.5 | 5 | 1 |
| Goldman Sachs Capital Markets | ⊙Yes ○No | 2.3 | 5 | 1 |
| Bank of America | ⊙Yes ○No | 1.5 | 5 | 1 |
| Salomon Brother Holding Co. | ⊙Yes ○No | 2.3 | 5 | 1 |
| Lehman Brothers Special Financing | ⊙Yes ○No | 1.5 | 5 | 1 |
| National Westminster Bank | ⊙Yes ○No | 2.3 | 5 | 1 |
| BNP Paribas | ○Yes ⊙No | | | |
| ABN-Amro NV | ⊙Yes ○No | 2.3 | 5 | 5 |
| Deutche Bank | ⊙Yes ○No | 1.5 | 5 | 1 |
| Bank of New York | ⊙Yes ○No | 2.3 | 5 | |
| Merrill Lynch Capital Services | ⊙Yes ○No | 2.3 | 5 | 5 |

OK    Cancel

FIG. 6B

Druid USD Swaps and Options Properties

Draw-Down | Eligibility | Customize | 154

Use this Tab only to:
1. View credit settings
2. Or, Customize credit settings

Legal Entities:

Merrill Lynch Capital Services

Proportional Draw-Downs: (170)

| | 2Yr | 5Yr | 7Yr | 10Yr |
|---|---|---|---|---|
| USD Swaps | 1600 | 1000 | 800 | 500 |
| USD Swapstion | 1200 | 900 | 700 | 350 |
| USD Cap/Floor | 1500 | 800 | 400 | 200 |

Available Credit (MM): (172)

| | 2Yr | 5Yr | 7Yr | 10Yr |
|---|---|---|---|---|
| USD Swaps | 1600 | 1000 | 800 | 500 |
| USD Swapstion | 1200 | 900 | 700 | 350 |
| USD Cap/Floor | 1500 | 800 | 400 | 200 |

Cusomize Buckets

OK    Cancel

*Scroll down to see all eligible legal entities*

Traders own orders in reverse video

Market Action Table  σ/#

| Exp/Ten | Strike | Status | Size | Bid | Offer | Size | Status |
|---|---|---|---|---|---|---|---|
| 3m- 10 | 7.25 | | 100 | 12.75 / | 13.50 | 50 | ABC |
| 1- 1 | 7.35 | | 50 | 14.00 / | 14.35 | 100 | |
| 1- 2 | 7.35 | | 200 | 14.20 / | 14.35 | 100 | |
| 1- 4 | 7.35 | | 100 | 15.00 / | 15.25 | 100 | ABC |
| 1- 5 | 7.40 | | 100 | 15.00 / | 15.25 | 50 | |
| 1- 5 | 5.00R | | 200 | 17.00 / | 18.00 | 300 | |
| 1- 7 | 7.20 | | 100 | 14.25 / | 14.75 | 100 | |
| 1- 10 | 7.20 | | 100 | 13.50 / | 13.75 | 50 | |
| 1- 15 | 7.15 | | 50 | 12.75 / | 13.15 | 50 | |
| 2- 2 | 7.40 | ABC | 100 | 14.50 / | | | |
| 3- 7 | 7.25 | | 50 | 13.75 / | | | |
| 4- 5 | 7.35 | | 100 | 14.20 / | 14.35 | 100 | |
| 5- 5 | 7.40 | | | / | 13.75 | 100 | |
| 5- 5 | 7.40BES | | 100 | xx.xx / | xx.xx | 150 | |
| 5- 10 | 7.50 | | 100 | 12.25 / | 12.50 | 100 | |
| 5- 15 | 7.45 | | 50 | 10.75 / | | | |
| 7- 10 | 7.45 | | 50 | 11.75 / | | | |

Action | Edit Order | Suspend All | Pull All

Market Action Grid     Mid | To DP

Message Portal     Message Ctrl

Bid Hit: 1-5  7.40  50MM Trading at 27.6 bps  -- 2:47pm

Offer Improved: 1-10  7.2  100  13.50 / 13.75  50 -- 2:52pm

METHOD AND SYSTEM OF MANAGING MUTUAL EARLY TERMINATION TERMS FOR THE ELECTRONIC TRADING OF FINANCIAL INSTRUMENTS

CROSS-REFERENCE TO RELATED APPLICATIONS

This application is a continuation-in-part of, and claims the benefit under 35 U.S.C. § 120 of, U.S. application Ser. No. 09/665,305, entitled "Method and System of Managing Credit for the Electronic Trading of Financial Instruments," filed Sep. 19, 2000 (issued as U.S. Pat. No. 7,110,972 on Sep. 19, 2006).

FIELD OF THE INVENTION

This invention generally relates to computerized brokerage systems and more particularly, to the electronic trading of financial instruments between various counterparties having unilateral or bilateral credit relationships.

BACKGROUND

When financial instruments, such as those listed in Table 1, are traded, the credit worthiness of the opposing counterparty is important because obligations of one or both parties under such financial instruments may extend up to and beyond thirty years. Each of the parties may be exposed to risk based upon the ability of a counterparty to fulfill its obligations. The resulting credit exposure over the life of a contract is potentially an unknown amount. Therefore, trading parties have a significant interest in limiting credit exposure.

One method by which credit risk may be mitigated is by including early termination provisions in the terms of the trade. For example, when entering into a contract to trade a 10-year swap, both parties may agree to give the counterparty an option after 5 years to terminate (i.e. "unwind") the contract at "fair value," calculated at the time the option is exercised. This gives each party the opportunity to evaluate the counterparty's credit worthiness at the future date. These terms are typically called "mutual puts," "early termination clauses" or "break clauses". The mutual put terms typically include two time parameters specifying when the parties may exercise the option: the initial time at which either party may exercise the option (the "first look" or "start date"), and the times, if any, at which such options may be exercised thereafter (the "period"). For example, a five year period may be exercised every five years after the first look dates for the life of the instrument, and a one year period may be exercised every year after the first look date for the life of the instrument. The parties may also specify other parameters, such as the last time the parties may exercise the option (the "last look"). The parties also agree, at the time the contract is entered into, as to the methods for settlement and calculating fair value, such as those methods set forth in the International Swaps and Derivatives Association ("ISDA"), 2000 *ISDA Definitions*.

A number of systems have been developed which attempt to automate the trading process and provide credit controls. For example, U.S. Pat. No. 6,014,627 describes an anonymous trading system which identifies the best bids and offers from those counterparties with which each party is eligible to trade. The system pre-screens each bid and offer for a particular type of financial instrument for compatibility with credit information to calculate a best price (the "dealable" price), for each entity dealing with the particular financial instrument.

U.S. Pat. No. 5,924,083 describes a distributed trading system for displaying a credit-filtered view of markets for financial instruments based upon credit limits entered by the trading parties. Each trading entity initially enters credit information which consists of the amount of credit that the trading entity is willing to extend to other trading entities for one or more types of trading instruments. Each trading entity may also create group credit limits by which the trading entity may limit the amount of credit it is willing to extend to a group of potential counterparties.

TABLE 1

F/X Products

American and European Options

Calls
Puts
Risk Reversals and Straddles
Strangles
Exotic Options

Knock-ins/outs
Reverse knock ins/outs
Other Instruments

Forwards
Fixed Income Products

Swaps

Swap spreads (traded with treasury hedge)
All-in rate swaps
Spread switches
All-in-rate switches
1-3, 3-6, 1-6 month LIBOR basis swaps
CP-3 month LIBOR basis swaps
Forward Rate Agreements 1/3/6 month LIBOR
FRA Switches
Swaptions European (payer, receiver, straddle)
Bermudan (payer, receiver, straddle)
Bermudan-European Switches (payer, receiver, straddle)
Caps/Floors LIBOR Cap/Floor, Straddle
LIBOR Digital Cap/Floor
Convexity Products Cap/Floor, Straddle (CMS/CMT 2, 5, 10, 30 year tenors)
Rolling Spread Locks against a spot hedge
Rolling Spread Locks quoted outright
Equity Index Products American and European Options Calls
Puts
Straddles PCT Application, No. PCT/US98121518 describes a credit preference method in an anonymous trading system for screening trades between entities. Three screening methods are described: a binary method in which each entity makes a yes or no determination as to whether or not it will deal with each potential counterparty; a line binary or time limit method in which each entity sets a maximum maturity of contracts for each potential counterparty; and a "complex" method in which each entity specifies a maximum amount it will trade with each counterparty for one or more "maturity bands." The system provides a "complex preference interface" through which a credit administrator for the trading entity can specify for each potential counterparty, the maximum exposure for each maturity band. For example, an entity could specify that for a given counterparty, it "will do up to $100 million out for 5 years, and then only $50 million out from thereafter out to 10 years, and nothing thereafter." In determining appropriate limits, the administrator use a measure of "risk equivalence" (RQ) which is calculated as a function of the potential exposure averaged over a series of time points, weighed by a discount factor.

In a typical "conversational" trading desk scenario in which traders enter and act on orders over the telephone, the traders may verbally negotiate for whether mutual puts will be required, and if so, the terms for such mutual puts (e.g. first look and period). At least one known automated trading system allows traders to enter into "free form" electronic messaging in which the traders may negotiate for mutual puts and relevant terms (e.g. first look and period). The traders are then required to report the mutual put parameters to trading system administrators who generate the appropriate confirmation forms. However, no known electronic or conversational system allows a credit administrator or other authorized user to set enforceable limits for mutual put requirements. Thus, there exists a need for a method and system of facilitating the enforcement of mutual put requirements for use with electronic trading systems.

SUMMARY OF THE INVENTION

These and other limitation of the prior art are addressed in the present invention which is a system and method of tracking credit limits between counterparties trading financial instruments on a trading system, where each financial instrument may have one or more tenors associated with it. Each trading party has a set of credit limits associated with each other potential trading party. This includes a credit limit for one or more tenors of each financial instrument to be traded. The tenors are grouped into sets of "buckets," where a single credit limit is applied to all tenors in an individual bucket A relationship is associated with the credit limits for a first group of buckets wherein credit extended on one of the tenors in an individual bucket proportionally reduces the available credit for the other buckets, and therefore the credit limit on each tenor in the buckets. When a trade is entered into between a party and a given counterparty for a given tenor, the credit limit for the bucket associated with the tenor is reduced by the amount of the trade and the credit limits on the related buckets are proportionally reduced. In a preferred embodiment, the credit limit of each bucket is reduced in proportion to an initial assigned credit limit.

In an embodiment of the invention, the credit limits associated with each other potential trading party further include mutual put requirements for contracts entered into between the parties.

BRIEF DESCRIPTION OF THE DRAWINGS

FIGS. 5A and 5B show an exemplary user interface for specifying draw down proportions for various tenors for financial instruments in accordance with the present invention;

FIG. 6A shows an exemplary user interface for setting eligibility as well as available credit multipliers for a plurality of counterparties in accordance with the present invention;

FIG. 6B shows an exemplary user interface for setting mutual put requirements for a plurality of counterparties;

FIG. 7 shows an exemplary user interface for customizing proportional draw downs for individual institutions;

FIG. 10 shows an exemplary trader screen including credit relationship status information for each bid and offer;

DETAILED DESCRIPTION OF THE INVENTION

Figure 1:
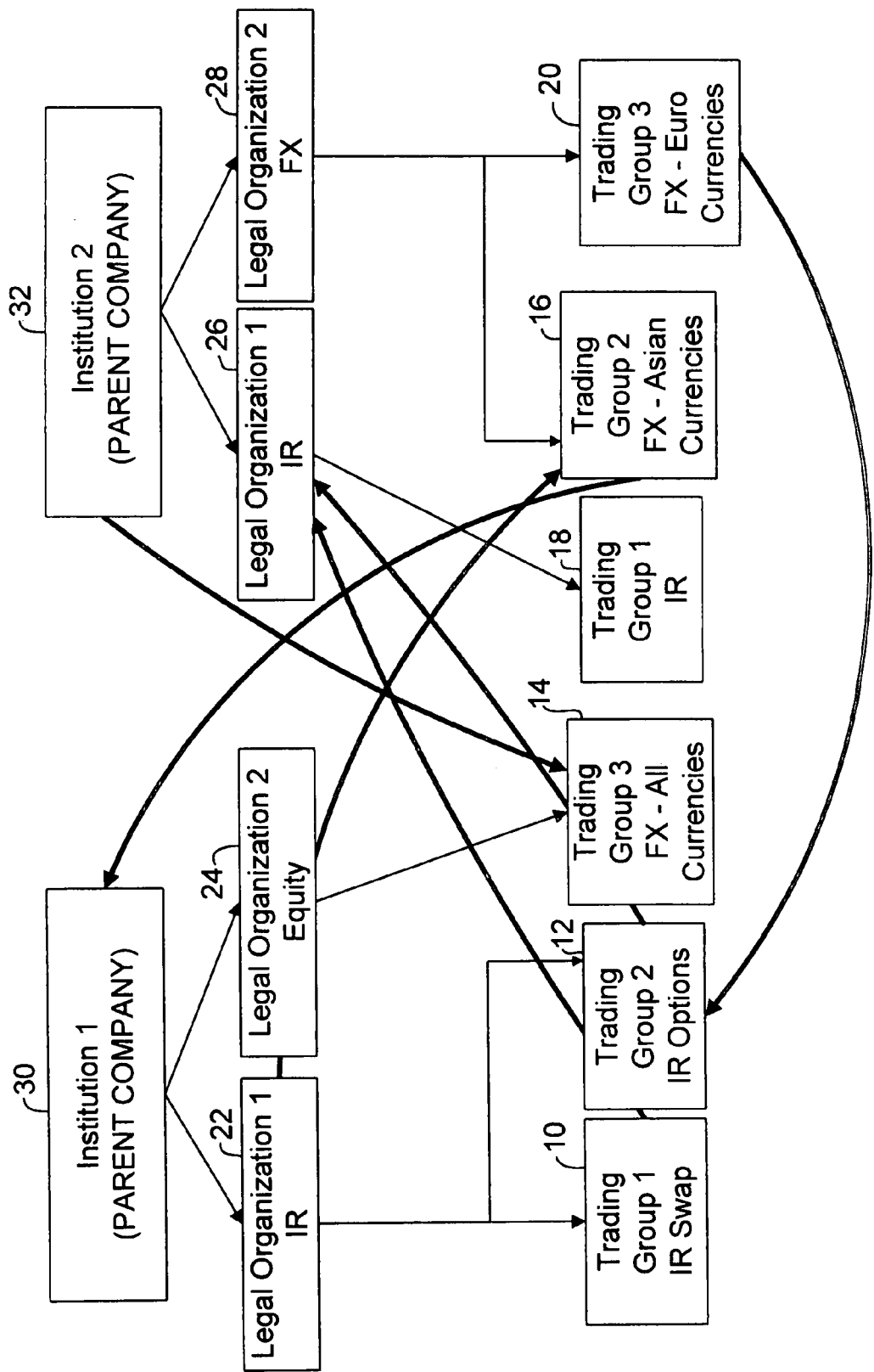
FIG. 1 is a schematic diagram of exemplary credit relationships formed between trading organizations in accordance with the present invention.

With reference to FIG. 1, a typical trading and credit scenario is described. Trades of financial instruments are typically performed between trading groups (10, 12, 14, 16, 18, 20). Each trading group typically trades one or more types of financial instruments. Each trading group also typically includes one or more individual traders. Credit relationships are typically established between trading groups and legal organizations (22, 24, 26 and 28). Alternatively, credit relationships may be formed between trading groups and parent companies of the legal organizations (shown as institutions 30, 32); or between any combination of trading groups, organizations, institutions, or other entity. Accordingly, the term "party" or "counterparty" shall refer to any institution, organization, trading group, or other entity which has a unilateral or bilateral credit relationship with another entity. In a typical scenario, a credit officer or someone with policy setting power for a party will define the amount of credit the party is willing to extend to each potential counterparty.

The invention is most suited to instruments that include on-going obligations, such as those listed in Table 1, but can also be applied to other instruments, such as stocks and bonds where a party's only significant risk is settlement. Moreover, the invention also applies to contracts based upon the exchange of any commodity, such as contracts for the exchange of bandwidth, real estate, electricity, processing power, freight transportation, etc. Thus the term "financial instruments" as used herein includes contracts based upon such commodities or services.

Figure 2:
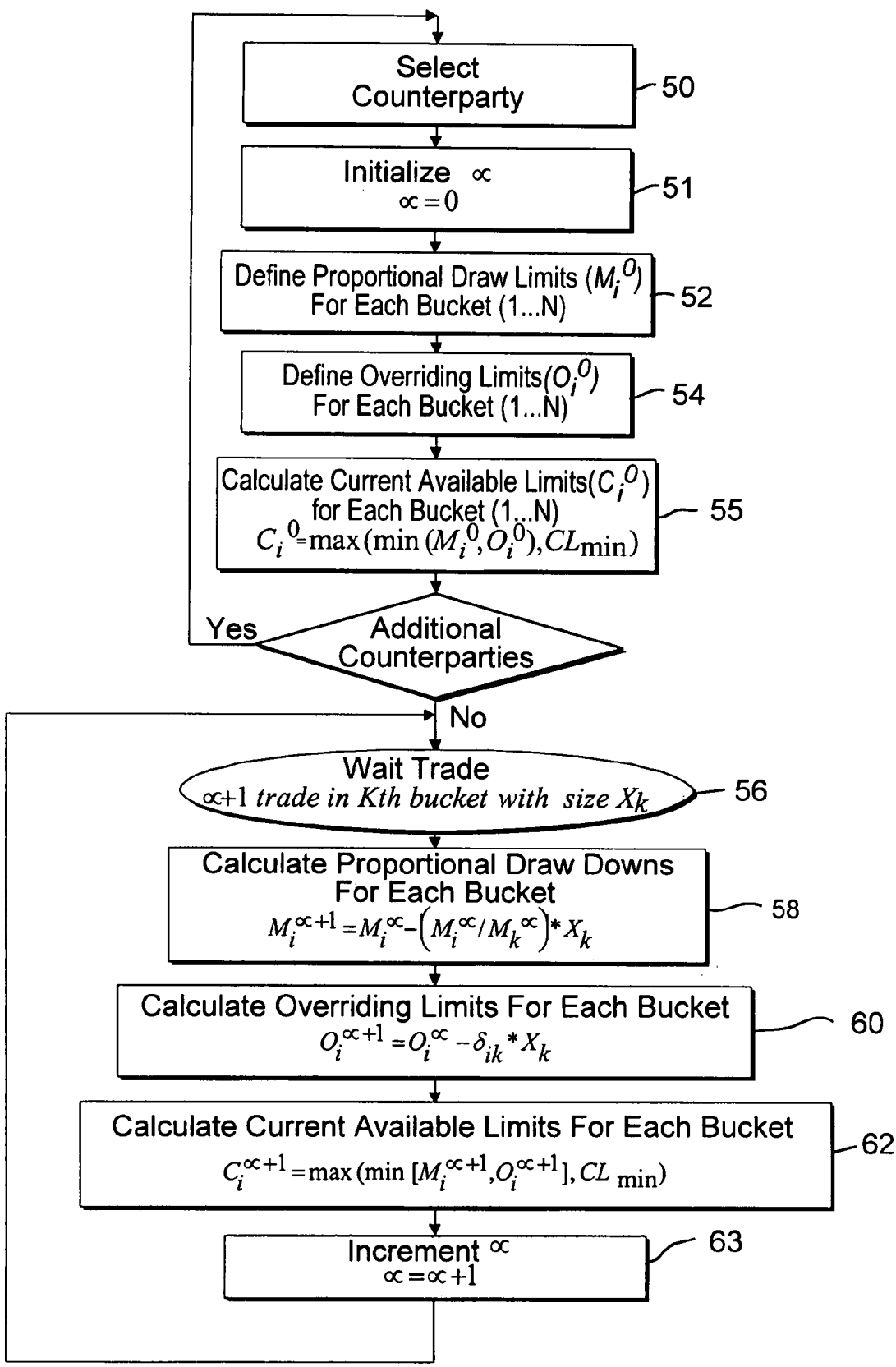
FIG. 2 is a flow chart of a preferred process for tracking credit limits in accordance with the invention.

With reference to FIG. 2, an overview of the system for entering and processing credit limits on buckets is described. For each potential counterparty (50), the system is initialized, i.e. α is set to zero (51), and the credit officer or other authorized user (referred to herein as an "administrator" or "credit officer") defines a Proportional Draw Down limit (52) for each bucket by tenor $M_i^0$ for buckets (i=1 . . . N). The administrator may combine several tenors or financial instruments into a single bucket. Thus, for example, the administrator may choose to set up three buckets for a given financial instrument, such as a two year tenor, a five year tenor and a seven year tenor. Any tenor for this financial instrument would then be assigned to one of these buckets based on its lifespan. In a preferred embodiment, any tenor of the financial instrument of two years or less would be assigned to the two year bucket; any tenor of the financial instrument of greater than two years but less than or equal to five years would be assigned to the five year bucket; and any tenor of the financial instrument of greater than five years but less than or equal to seven years would be assigned to the seven year bucket. Any tenor of the financial instrument of greater than seven years could not be traded unless the administrator chose to create an additional bucket of a longer tenor. In an alternate embodiment, tenors of greater than the maximum bucket tenor are given a "maybe" trading status, as described further below. The administrator further decides how buckets are related. For example, all tenors of a given financial instrument are typically related. In addition, the administrator may also decide to group different financial instruments, such as swaps and options, together, such that credit drawn down for swaps will reduce the credit available for the options.

The Proportional Draw Down for each bucket represents the amount of trading that could potentially be done (on a notional basis) in a single bucket that would completely exhaust the entire credit limit of a given counterparty. Combined, the Proportional Draw Downs for a group of buckets give the proportional relationship between trades done in different buckets. In one embodiment of the invention, the administrator may further define an Overriding Credit Limit (54) for each bucket $O_i^0$ for buckets (i=1 ... N) which is an additional constraint on credit that further limits the trading in any bucket. The Overriding Credit Limit is the maximum that may be drawn down from a given bucket. The Current Available credit limit at any given time for each bucket is then the minimum of the Proportional Draw Down and the Overriding Credit Limit. In one embodiment, the administrator may further specify a minimum trade amount ($CL_{min}$) below which trades will be allowed. This may be a global variable or assigned individually for each entity. Optionally, this minimum is simply set to zero.

The Proportional Draw Downs create a relationship between the various buckets for the various instruments, such that the trading in any instrument in any single bucket will have an effect on all of the instruments in any related buckets. While the present invention is described in terms of Proportional Draw Downs, other methods of specifying the relationship between tenors of financial instruments are within the scope of the invention and will be apparent to those of skill in the art based on the specification herein. These alternate methods include, without limitation, specifying the fractional relationships between buckets. Thus, for example, one could specify a credit relationship between ten year, five year, and two year tenors, for a given option, as 1:4; 1:2; and 1:1. Once the administrator defines the Proportional Draw Downs, and, optionally, the Overriding Credit Limits, the system calculates (55) initial Currently Available Limits for each bucket $C_i^0$ for buckets (i=1 ... N). The initial Currently Available Limits are preferably calculated according to the formula:

$$C_i^0 = \max(\min[M_i^0, O_i^0], CL_{min}).$$

As shown in FIG. 2, after the Proportional Draw Down Limits and Overriding Limits are defined, and the initial Currently Available Limits are calculated, the system is ready to process trades (56). A preferred methodology utilizing the concept of Proportional Draw Downs along with Overriding Limits to track Current Available Limits is now described:

Suppose there are N Buckets: 1 ... N.

Suppose that there have been $\alpha$ ($\alpha=0, 1, 2, \ldots$) trades done so far.

Denote the values of the Proportional Draw Downs for the N buckets after $\alpha$ trades as $M_i^\alpha$, i=1 ... N, the values of the Overriding Limits as $O_i^\alpha$, i=1 ... N, and the values of the Current Available Limits as $C_i^\alpha$, i=1 ... N.

Suppose that the $\alpha+1$ trade is done (56) in the $k^{th}$ bucket with size $X_k$.

In one embodiment of the invention, both parties to a trade will draw down the credit limits available to the opposing party for any trade. In another embodiment, trades for certain types of instruments having non-symmetrical credit risks will only draw down against the credit limits for one of the parties. For example, the buyer of an option would want to reduce the credit limit of the party it is buying the option from, whereas the seller of an option may not want to reduce the credit limit of the party it is selling the option to. In this embodiment, the system will determine whether to reduce one or both parties respective credit limits based on the nature of the instrument and whether the party is a buyer or a seller.

The system calculates (58) (for at least one counterparty) new values for the Proportional Draw Downs as:

$$M_i^{\alpha+1} = M_i^\alpha - (M_i^\alpha / M_k^\alpha) * X_k. \quad (1)$$

The system calculates (60) (for at least one counterparty) new values for the Overriding Limits as:

$$O_i^{\alpha+1} = O_i^\alpha - \delta_{ik} * X_k. \quad (2)$$

where $\delta_{ik}$ is the well known Kronecker Delta and has a value equal to 0 if i is not equal to k and a value equal to 1 if i equals k.

The system calculates (62) (for at least one counterparty) new values for the Current Available Limits as:

$$C_i^{\alpha+1} = \max(\min[M_i^{\alpha+1}, O_i^{\alpha+1}], CL_{min}). \quad (3)$$

where max is the maximum function which compares the two arguments and returns their maximum, and min is the minimum function which compares its two arguments and returns their minimum.

As noted above, in one embodiment $CL_{min}$ is automatically set by the system to zero. This ensures that the counterparty's credit limit will never be less than zero. However, $CL_{min}$ may be changed by an authorized user. Finally, $\alpha$ is incremented (63)

For the case of a typical trading desk authorized to trade swaps and options the following examples will help to understand the invention. Assume the trading desk's credit officer has specified the values for Proportional Draw Downs and Overriding Limits as shown in the first two rows of Table 2 and Table 3 below. Initially no trades have taken place (i.e. $\alpha=0$).

TABLE 2

| SWAPS | 2 Year ("bucket 1") | 5 Year ("bucket 2") | 10 Year ("bucket 3") |
| --- | --- | --- | --- |
| Proportional Draw Down ($MM) | 400 | 200 | 100 |
| Overriding Limit ($MM) | 300 | 100 | 80 |
| Current Available Limit ($MM) | 300 | 100 | 80 |

TABLE 3

| OPTIONS | 2 Year ("bucket 4") | 5 Year ("bucket 5") | 10 Year ("bucket 6") |
|---|---|---|---|
| Proportional Draw Down ($MM) | 800 | 400 | 200 |
| Overriding Limit ($MM) | 500 | 400 | 200 |
| Current Available Limit ($MM) | 500 | 400 | 200 |

If we let the two year bucket for Swaps be bucket 1; the five year bucket for Swaps be bucket 2; the 10 year bucket for Swaps be bucket 3; the two year bucket for Options be bucket 4; the five year bucket for Options be bucket 5; and the ten year bucket for Options be bucket 6; the values for Proportional Draw Downs, Overriding Limits, and Current Available Limits are as follows:

$M_1^0=400$, $M_2^0=200$, $M_3^0=100$, $M_4^0=800$, $M_5^0=400$, $M_4^0=200$;

$O_1^0=300$, $O_2^0=100$, $O_3^0=80$, $O_4^0=500$, $O_5^0=400$, $O_4^0=200$;

$C_1^0=300$, $C_2^0=100$, $C_3^0=80$, $C_4^0=500$, $C_5^0=400$, $C_4^0=200$.

Now assume a trade takes place consisting of $40 MM of 2 year Swaps. The value for the trade size is: $X_1=40$.

The new values (i.e. the $\alpha+1$ values) for the Proportional Draw Downs, Overriding Limits, and Current Available Limits can then be calculated using equations (1), (2), and (3) respectively.

For example:

$$M_1^1 = 400 - (400/400)*40 = 360;$$

$$O_1^1 = 300 - 1*40 = 260;$$

$$C_1^1 = \max(\min(360, 260), 0) = 260.$$

Tables 2 and 3 can then be updated with the new values as shown in Tables 4 and 5, respectively.

TABLE 4

| SWAPS | 2 Year | 5 Year | 10 Year |
|---|---|---|---|
| Proportional Draw Down ($MM) | 360 | 180 | 90 |
| Overriding Limit ($MM) | 260 | 100 | 80 |
| Current Available Limit ($MM) | 260 | 100 | 80 |

TABLE 5

| OPTIONS | 2 Year | 5 Year | 10 Year |
|---|---|---|---|
| Proportional Draw Down ($MM) | 720 | 360 | 180 |
| Overriding Limit ($MM) | 500 | 400 | 200 |
| Current Available Limit ($MM) | 500 | 360 | 180 |

In a more general embodiment of the invention, Overriding Limits are not required. In essence, this is a special case of the above methodology in that it is equivalent to setting the Overriding Limit to the Proportional Draw Down for each bucket. The mathematical model for this case is as follows:

Suppose there are N Buckets: 1 ... N.

Suppose that there have been $\alpha$ ($\alpha=0, 1, 2, \ldots$) trades done so far.

Denote the values of the Proportional Draw Downs for the N buckets as $M_i$, i=1 ... N.

Denote the values of the Current Available Limits after a trades as $C_i\alpha$, i=1 ... N.

Suppose that the $\alpha+1$ trade is done in the $k^{th}$ bucket with size $X_k$.

The new values for the Current Available Limits are $$C_i^{\alpha+1} = \max [C_i^\alpha - (M_i/M_k)*X_k, CL_{min}]. \quad (4)$$

Equation (4) can be employed in a similar manner to equation (3) above to continually track available credit. As above, in one embodiment $CL_{min}$ is automatically set to zero, but may, alternatively, be administrated as noted above.

In one embodiment of the invention, the system implements the above procedure by normalizing the credit limits in buckets 1 ... N to the credit limit for a single bucket, called a Normalized Total Credit (NTC). The buckets are typically normalized to the maximum tenor, for example, the swaps of Table 2 above would be normalized to $100 million ten year swaps.

Thus, for example the conversion ratios ($CR_i$) for the two, five, and ten year swaps of Table 2 could be expressed as: 0.25, 0.5, and 1, respectively, where NTC is the normalized total credit ($100 million) with respect to the ten year swap.

Figure 3:
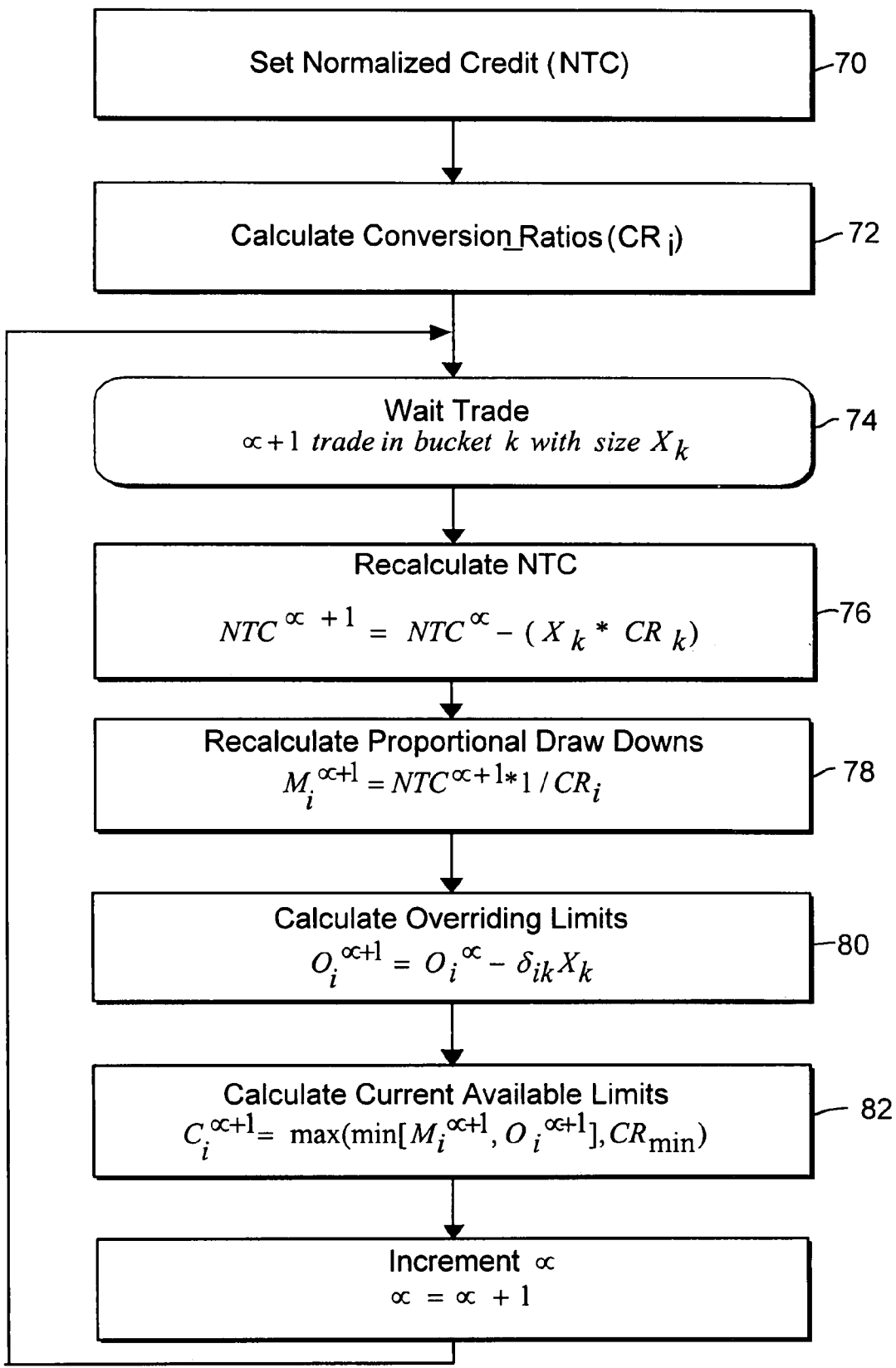
FIG. 3 is a flow chart of a method for calculating proportional draw downs and currently available limits in accordance with the present invention.
Figure 4:
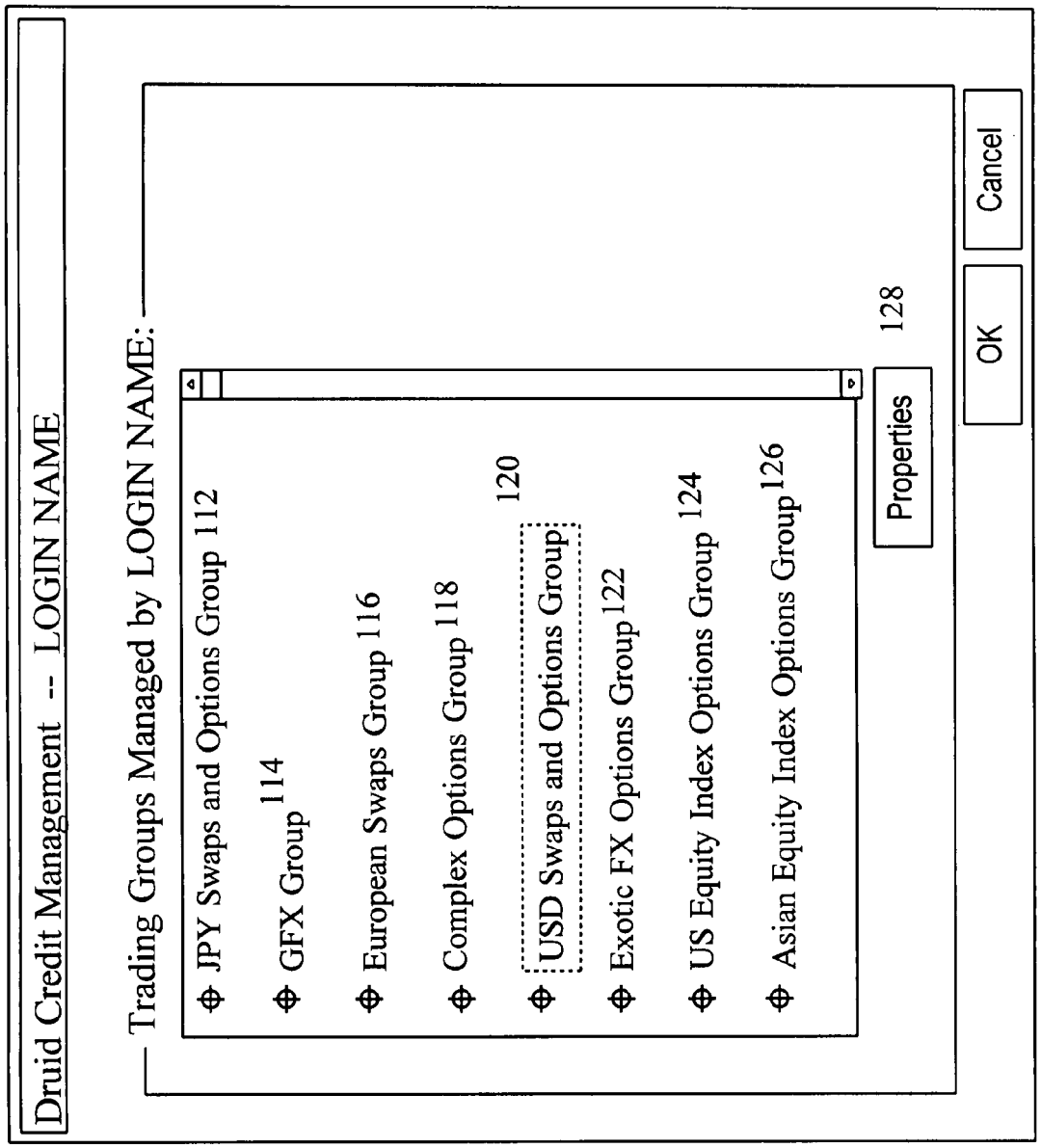
FIG. 4 shows an exemplary user interface for selecting trading groups in accordance with the present invention.

With reference to FIG. 3, a preferred method for calculating credit limits using NTC is now discussed. Once the Proportional Draw Downs and Overriding Credit Limits have been entered, the NTC must be set (70). As noted above, this is typically set equal to the Proportional Draw Down of the maximum tenor for at least one instrument, but may be set equal to any draw down limit or any arbitrary value. The conversion ratios ($CR_i$) are then calculated (72) for each bucket as the ratio of the NTC over credit limit for that bucket. When a signal indicating the $\alpha+1$ trade has occurred for a tenor falling in the $k^{th}$ bucket for amount $X_k$, is being entered into is received (74), the system recalculates (76) the NTC as:

$$NTC^{\alpha+1} = NTC^\alpha - (X_k * CR^i).$$

Proportional Draw Downs for each bucket ($M_i$) are calculated (78) as:

$$M_i^{\alpha+1} = NTC^{\alpha+1} * 1/CR_i.$$

Overriding Credit Limits ($O_i$) are calculated (80) as:

$$O_i^{\alpha+1} = O_i^{\alpha-1} - \delta_{ik} * X_k.$$

Current Available Limits ($C_i^\alpha$) are calculated (82) as:

$$C_i^{\alpha+1} = \max (\min [M_i^{\alpha+1}, O_i^{\alpha+1}], CL_{min}).$$

Continuing the example from Table 2 and 3 above, Tables 6 and 7 show initial Proportional Draw Downs of 400, 200, and 100 million, and Overriding Credit Limits of 300, 100, and 80 million for 2, 5 and 10 year swaps; and Proportional Draw Downs of 800, 400, and 200 million and Overriding Credit Limits of 500, 400, and 200 for 2, 5, and 10 year options, respectively.

TABLE 6

| SWAPS | 2 Year | 5 Year | 10 Year |
|---|---|---|---|
| Proportional Draw Down ($MM) | 400 | 200 | 100 |
| Conversion Ratio | CR: .25 | CR: .5 | CR: 1 |
| Overriding Limit ($MM) | 300 | 100 | 80 |
| Current Available Limit ($MM) | 300 | 100 | 80 |

TABLE 7

| OPTIONS | 2 Year | 5 Year | 10 Year |
|---|---|---|---|
| Proportional Draw Down ($MM) | 800 | 400 | 200 |
| Conversion Ratio | CR: .125 | CR: .25 | CR: .5 |
| Overriding Credit Limit ($MM) | 500 | 400 | 200 |
| Current Available Limit ($MM) | 500 | 400 | 200 |

Assume forty million dollars of two year swaps, sixty-five million dollars of ten year swaps, as well as eighty million dollars of two year options are traded. NTC is calculated as follows:

$$NTC=100-(40\times 0.25)-(65\times 1)-(80\times 0.125)=15.$$

The new available limits, as shown in Tables 8 and 9 are calculated being 30 for the five year swaps or 2 times the ten year NTC, 60 for the two year swap or 4 times the ten year NTC, and the new values for the options are 2 times the ten year NTC or 30 for the ten year options, the five year options maximum is 60 or 4 times the ten year NTC, and the new two year options limit is 8 times the ten year NTC or 120. Had any of the overriding credit limits been less than the calculated available limits, those values would have been used. Also, tables 8 and 9 have been updated to reflect updated Overriding Credit Limits.

TABLE 8

| SWAPS | 2 Year | 5 Year | 10 Year |
|---|---|---|---|
| Proportional Draw Down ($MM) | 60 | 30 | 15 |
| Overriding Credit Limit ($MM) | 260 | 100 | 15 |
| Current Available Limit ($MM) | 60 | 30 | 15 |

TABLE 9

| OPTIONS | 2 Year | 5 Year | 10 Year |
|---|---|---|---|
| Proportional Draw Down ($MM) | 120 | 60 | 30 |
| Overriding Credit Limit ($MM) | 420 | 400 | 200 |
| Current Available Limit ($MM) | 120 | 60 | 30 |

With reference to FIGS. 4-9, a preferred interface for managing credit limits will now be described. The credit officer, administrator, or other authorized user selects from a list of trading groups (shown as 112, 114, 116, 118, 120, 122, 124 and 126). The credit officer will select one or more of these trading groups and set trading properties for the selected group or groups. The credit officer enters the properties screen by selecting the properties link (128). Overriding Credit Limits may be specified using a similar interface (not shown) for embodiments including overriding credit limits.

Figure 8:
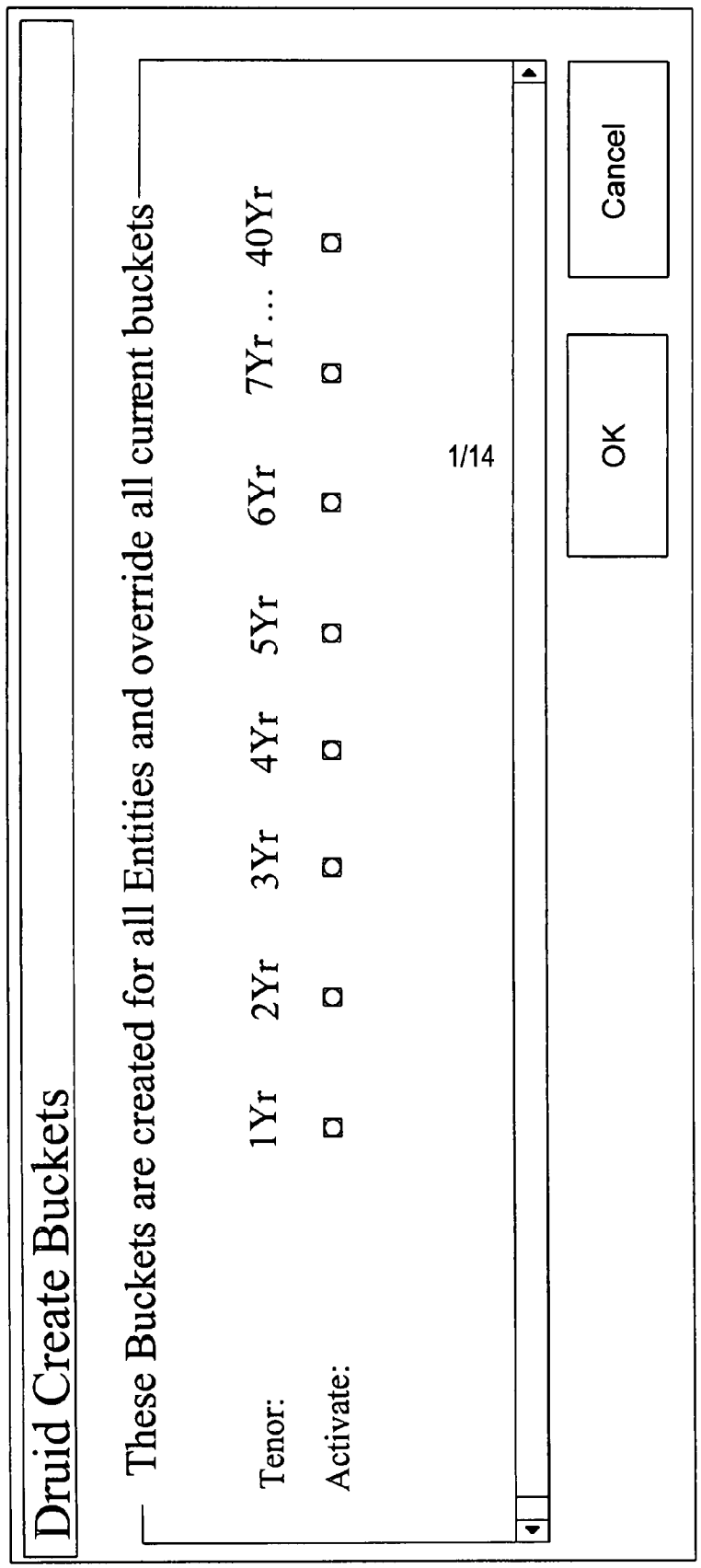
FIG. 8 shows an exemplary user interface for globally selecting buckets of financial instruments.
Figure 9:
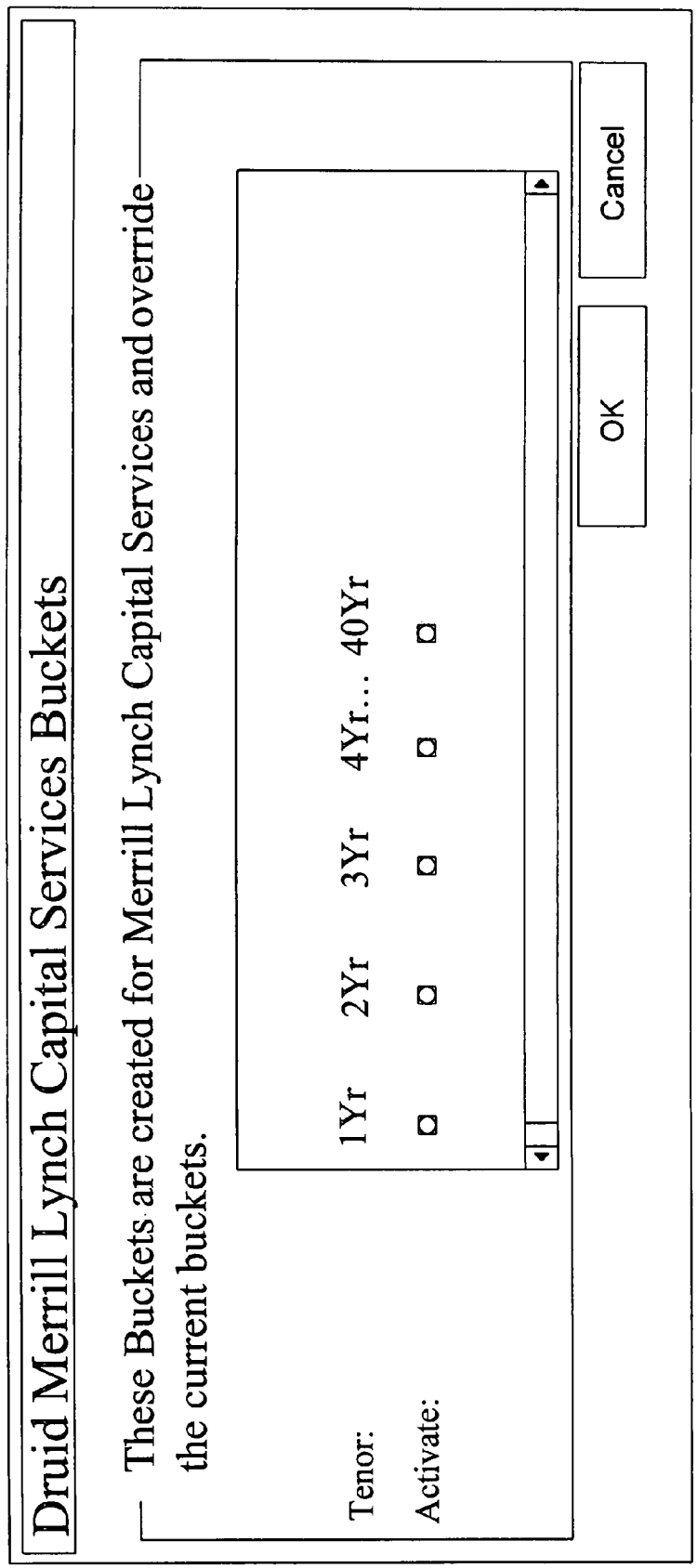
FIG. 9 shows an exemplary user interface for setting buckets for an individual institution.

FIG. 5A shows a draw down proportion screen (tab 150), including a draw down matrix (128), having three instruments, swaps (130), swaptions (132) and cap/floors (134). Additional instruments traded by the specific trading group, in this example, the USD Swaps and Options group, may be available by scrolling down the screen (not shown). In this example, four buckets for each instrument are displayed, two year (140), five year (142), seven year (144) and ten year (146). As noted above, each tenor for any listed instrument will be assigned by the system to one of the buckets for that instrument. The credit officer will enter the Proportional Draw Downs for each bucket for each instrument. For example, in FIG. 5A, the officer has entered 1600 for two year swaps, 1000 for five year swaps, etc. As shown in FIGS. 8 and 9, the credit officer can redefine the number, and tenor, of buckets, either globally (FIG. 8) or on an individual trading group (FIG. 9) basis.

Figure 5B:
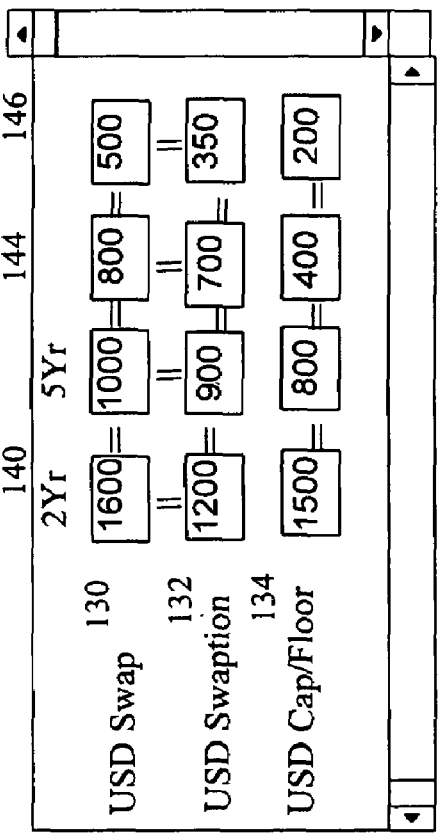

As shown by the horizontal and vertical "=" symbols in the draw down matrix (128), the Proportional Draw Downs for each tenor (140, 142, 144 and 146) of the instruments (130, 132 and 134) will be related. Thus, 500 in ten year swaps will be equivalent in draw down of credit to 1500 in two year cap/floors. As shown in FIG. 5B, in one embodiment, the credit administrator may specify that certain instruments and/or tenors are not related, by turning off the horizontal and/or vertical "=" symbols. For example, in FIG. 5B, the credit administrator has created two sets of buckets, one for USD swaps and USD swaptions, and a second for USD Cap/Floor. Thus, trading in the USD Cap/Floor instruments will not effect credit levels in the USD swaps and USD swaptions set of buckets. Likewise, trading in USD swaps or USD swaptions will not effect the credit levels in the USD Cap/Floor buckets.

Any instrument with a tenor not falling within a specific bucket will preferably be automatically grouped to the next higher bucket. Thus, for the example shown in FIG. 5A, trading a six year swap will be the same as trading a seven year swap for credit purposes. In another embodiment, any instrument with a tenor not falling within a bucket will be allocated among the next higher and next lower buckets by mathematical interpolation. For the example shown in FIG. 5A, a trade in a six year swap in this embodiment may have one half of its notational size drawn down from the five year bucket and one half drawn down to the seven year bucket.

FIG. 6A shows an eligibility screen (tab 152), including an eligibility matrix (160), having a list of eligible entities (162), a binary eligibility list (164) and a draw down multiple (166). A trading group profile specifies which entities will be included in the eligible institution list (162). The first time the credit officer accesses the eligibility screen (tab 152), eligibility is defaulted to yes for all entities in the eligible institution list and the multiplier (166) is defaulted to 1.0. Any entities not included in the list will be assumed to be eligible, although their multiplier will be set to zero. Thus, as described below, new institutions will be given "maybe" status until the administrator further specifies credit status for that institution. The credit officer may modify eligibility for any specific institution by clicking on the binary eligibility list (164). The draw down multiple list allows the credit officer to easily multiply the drawn down matrix (128) set above in FIG. 5A by a multiplication factor. For example, Morgan Guarantee Trust has been assigned a multiple of 2.0 in FIG. 6A. The system would then multiply each entry in the draw down matrix (128) of FIG. 5A by a factor of 2.0. For example, the two, five, seven and ten year limits for USD Swaps for Morgan Guarantee Trust would be set to 3200, 2000, 1600 and 1000 for two, five, seven and ten year buckets, respectively.

FIG. 7 shows a customization screen (tab 154), including a customizable draw down matrix (170) and an available credit limit matrix (172) for each trading institution. The credit officer may individually set the draw down limits for each bucket and instrument for each trading institution. The screen allows the credit officer to scroll down to additional trading entities. Users without credit setting power may view this screen to see the available credit limits for each institution, but preferably, are not allowed to modify credit limits.

As shown in FIG. 10, credit relationships in accordance with the present invention may be displayed on trader screens such that the credit relationship for individual trades may be displayed while keeping the identity of the potential trading counterparty anonymous. In a preferred embodiment, individual bids and offers are displayed with an indication, preferably specific colors, corresponding to the potential credit relationship of the counterparty. Bids and offers on which credit is bilaterally approved according to the credit relationship scheme are indicated by a first color, preferably green (shown as standard font text in FIG. 10). Bids and offers having a "maybe" status as to credit are indicated by a second color, preferably yellow (shown as underlined text in FIG. 10). A bid or offer will have a "maybe" status when credit was initially assigned by either party to the potential counterparty but has been used up, at least for the specific tenor, through one or more trades. These are considered "maybe" in the preferred embodiment because credit officers typically spread credit over a variety of systems and are often willing to further extend credit on one or more systems to a specific counterparty, particularly when the credit for the given counterparty has been used up on one system but not another. Alternately, "maybe" status for a potential counterparty would arise where the initial proportional draw downs or overriding credit limits have been set to zero. Bids and offers in which one or both parties have a "no" status are indicated with a third color, preferably red (shown as bold/italic in FIG. 10). This occurs when the credit officer for either party indicates they will not trade with the entity associated with the bid and/or offer. Traders using this system will immediately know the credit status, "yes," "no," or "maybe," of any bid or offer on the system before attempting to enter into a trade.

FIG. 6B shows an eligibility screen (tab 152) in an embodiment of the invention utilizing mutual put requirements (400) including a start, or first look, list (402) and a maximum period list (404) (referred to as a "period" herein). For example, line 406 indicates that in order to trade a given financial instrument with Merrill Lynch Capital Services, an early termination agreement must be entered into having a first exercise time no longer than 10 years after the trade is entered into and additional exercise times on at least every 5 year anniversary of the first exercise date for the duration of the financial instrument. For financial instruments having tenors less than the start time (402), no mutual put would be required. Other potential mutual put parameters are possible, such as a termination date or a "minimum period" (both discussed below). This screen (tab 152) also preferably includes a list of eligible entities (162), a binary eligibility list (164) and a draw down multiple (162). The mutual put requirement list (400) allows the credit officer, or other authorized user, to set mutual put time requirements for each potential counterparty. As shown, mutual put requirements may include a start, or first look, time (402) and a period thereafter (404). A "single look" option may be specified by entering a start date (402) and leaving the period field (404) blank. With a "single look," the mutual put can only be exercised once, at the time specified in the start field (402). The credit officer may indicate that no mutual put option is required such as by entering a start time (402) which is longer than the longest tenor instrument traded with a potential counterparty or by leaving the start field (402) blank. Also, the period field (404) does not become active (i.e. can not be changed) unless the start time (402) is specified. Alternate methods for indicating that no mutual put is required could be used. The mutual put requirements are stored by the system in a database.

Figure 12:
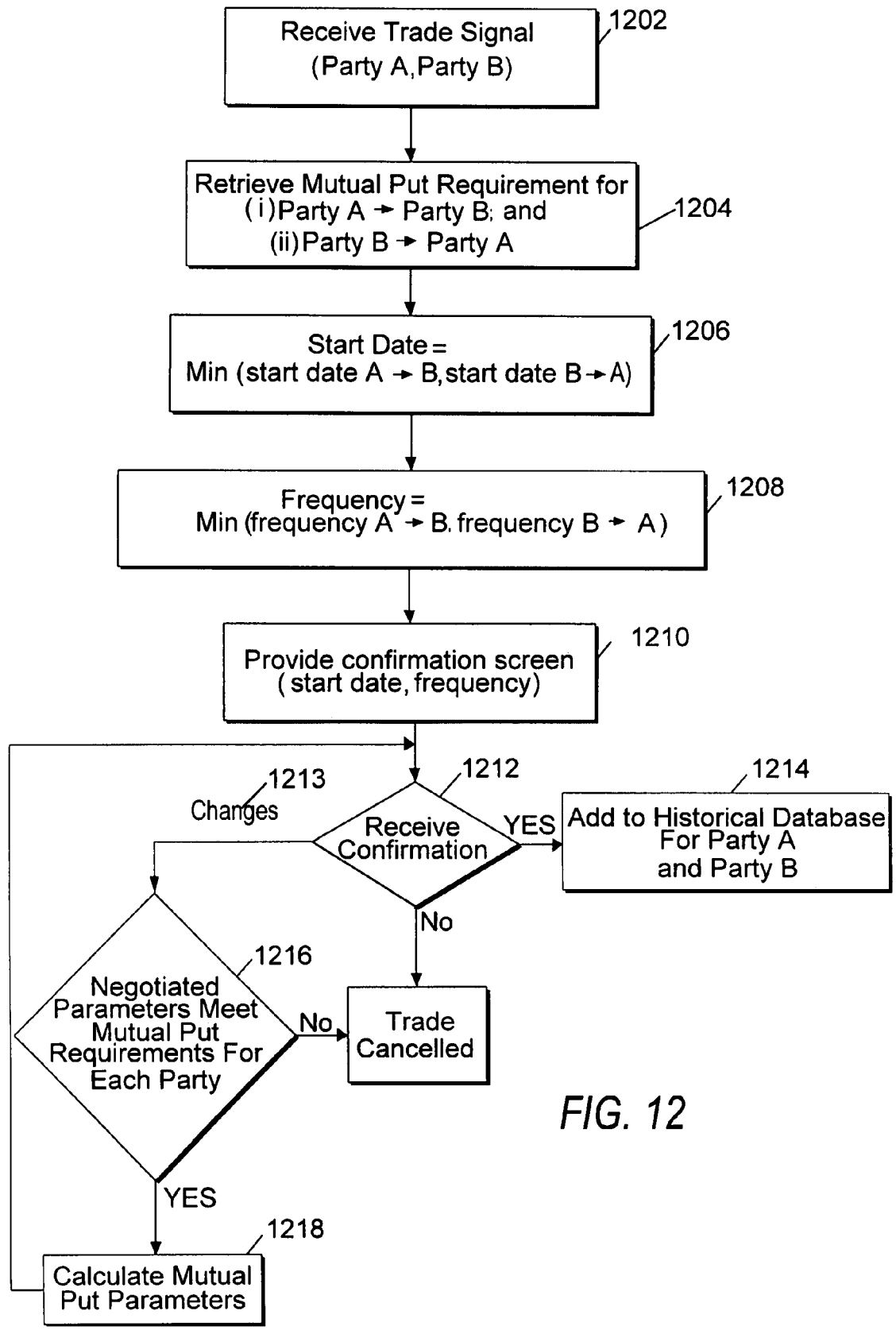
FIG. 12 is a flow chart of a method of enforcing mutual put parameters in accordance with the present invention.

As shown in FIG. 12, mutual put requirements are preferably automatically enforced between counterparties. The system receives a signal (1202) indicating two parties (Party A and Party B) wish to enter into a trade. The system retrieves (1204) the bilateral mutual put requirements that were previously stored and calculates a set of mutual put parameters for the trade. In one embodiment, each mutual put requirement will have a first look variable and a period variable. The system preferably calculates (1206) the minimum start date as the minimum of (the start date specified by a credit officer for Party A for trades with Party B, and the start date specified by a second credit officer for Party B for trades with Party A). Likewise, the minimum period will be calculated (1208) as the minimum of (the period specified by the credit officer for Party A for trades with Party B, and the period specified by the credit officer for Party B for trades with Party A). As mentioned above, a single look may also be specified by one or both counterparties. The period on a single look can be thought of as infinite. Therefore, if the credit officer for Party A specified a single look for trades with Party B, and the credit officer for Party B specifies both a first look and a period for trades with Party A, the period specified by Party B will be the minimum and, thus, used.

Alternatively, mutual put parameters may be calculated by other methods to meet the needs of the parties utilizing the system. For example, if certain parties do not have the backoffice facilities to handle frequent "looks," i.e. small periods, they will be interested in demanding a certain minimum period below which they will not want to trade. Thus, in one embodiment, credit officers may specify a "minimum period" for mutual puts. This may be entered on an individual counterparty basis, such as through a minimum period list (not shown), or on a global basis for all potential counterparties. The system will calculate the mutual put parameters for this "minimum period" as the maximum of (the minimum period specified by a credit officer for Party A for trades with Party B, and the minimum period specified by a credit officer for Party B for trades with Party A.) In one embodiment, credit officers may specify both a minimum period and a maximum period (as noted above referred to as the "period" herein) for various counterparties. The system will verify that the minimum of the bilateral maximum periods is not too frequent for either counterparty, i.e. is not less than the minimum period for either counterparty.

It will be obvious to those skilled in the art that while FIG. 12 shows the step of receiving a trade signal (1202) before the steps of calculating the mutual put parameters (1206, 1208), mutual put parameters between each pair of potential counterparties could be pre-calculated (1206, 1208) and stored in a 2 dimensional table. The system then looks up the pre-calculated mutual put requirements in response to receiving a trade signal (1202).

The system preferably provides a confirmation screen to both parties asking them to confirm the trade and the calculated mutual put parameters, e.g. start date and period. Preferably, the identity of the counterparty is disclosed in this notice. If the system receives (1212) confirmation from both parties, the trade is added (1214) to the historical database for both parties. Because the mutual put information is kept in defined fields in the system, this information can be easily reported to the party's credit officer or other interested authorized user.

In one embodiment of the invention, traders for Party A and Party B may further negotiate the mutual put parameters. In this embodiment, traders may enter appropriate mutual put data into specified fields on the confirmation screens (1213). The system verifies (1216) that the mutual put data entered by the traders satisfy the minimum mutual put requirements specified by their respective credit officers. As noted above, a credit officer may specify that no mutual put option is required. In this case, a trader associated with that credit officer is free to suggest any set of mutual put data to the counterparty for the trade. The system will then calculate the mutual put parameters by finding the minimum(s) of the mutual put data entered by the parties.

As noted above, other methods of calculating (1218) the mutual put parameters may be used.

Figure 11:
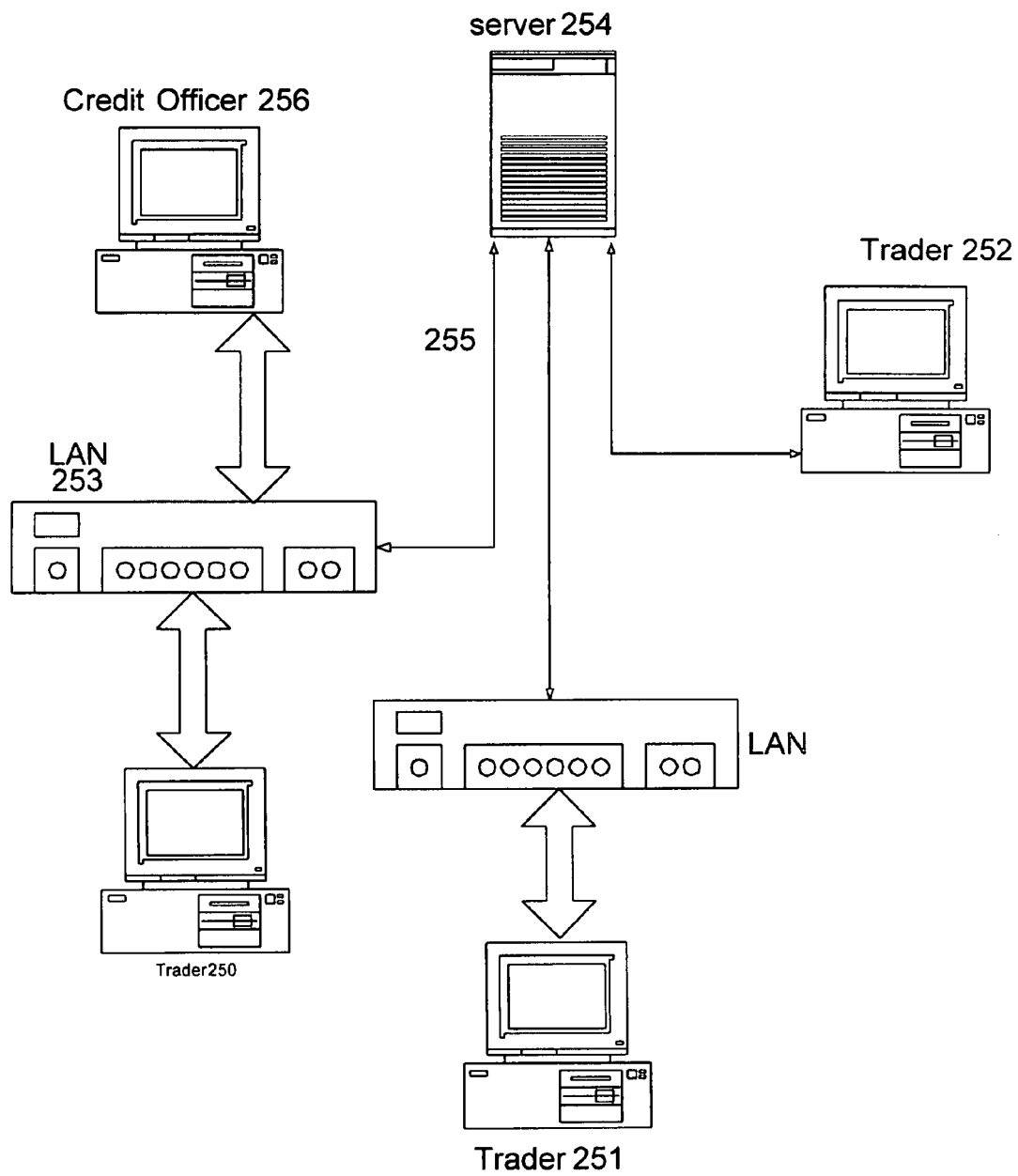
FIG. 11 is a schematic of an exemplary computer network implementing the a disclosed invention.

The system is preferably implemented utilizing a computer network as disclosed in FIG. 11. Each trader station (250, 251 and 252) is connected to the server (254) through the network (255). The network (255) is preferably a private network connected through any number of means, such as T1 lines, digital subscriber lines, cable modems, satellite links, or other available connection means. One or more trader stations for a trade group may be coupled via a local area network (253). A credit officer station (256) also is preferably coupled via the same local area network (253) to server (254). Alternatively, trader stations (250, 251 and 252) may be coupled to server (254) through any of a number of means, such as via a public network such as the Internet or via a virtual private network. The system preferably utilizes a client-server architecture in which trader stations (250, 251 and 252) execute a thin-client written in Java to communicate with the server (254). In an alternate embodiment, the server (254) acts as a web server and communicates with trader stations (250, 251 and 252) using a page description language, such as HTML. In this embodiment, traders interact with server (254) using an HTML compatible browser (e.g., Netscape Navigator® or Microsoft Internet Explorer®).

Although the present invention was discussed in terms of certain preferred embodiments, the description is not limited to such embodiments. Rather, the invention includes other embodiments including those apparent to a person of ordinary skill in the art. Thus, the scope of the invention should not be limited by the preceding description but should be ascertained by reference to claims that follow.

What is claimed is:

1. A method for the trading of financial instruments between at least a first party and a second party of tracking, with the aid of a computer system, credit requirements for mutual puts, the mutual puts having an option by at least one said party to unwind said financial instrument in the future, comprising:
storing a first set of mutual put requirements associated with said first party for trades with said second party;
storing a second set of mutual put requirements associated with said second party for trades with said first party;
at least one of said first set of mutual put requirements and said second set of mutual put requirements requiring the ability to unwind said financial instrument in the future;
receiving a trade indication identifying said first party and said second party; and
calculating a set of mutual put parameters based on said first set of mutual put requirements and said second set of mutual put requirements.

2. The method of claim 1 further comprising:
facilitating the display of said set of mutual put parameters to said first party and said second party.

3. The method of claim 1 further comprising:
providing a confirmation screen to each of said first party and said second party, said confirmation screen including said calculated set of mutual put parameters.

4. The method of claim 3 further comprising:
receiving a confirmation indication from each of said first party and said second party.

5. The method of claim 4 wherein said trade indication is associated with a trade; said confirmation indication being selected from the group consisting of confirm said mutual put parameters, renegotiate said mutual put parameters or cancel said trade associated with said trade indication.

6. The method of claim 5 further comprising:
in response to receiving said renegotiate mutual put parameter confirmation indication,
receiving mutual put data, and
verifying that said mutual put data satisfy said first set of mutual put requirements and said second set of mutual put requirements.

7. The method of claim 1 wherein said first party and said second party trade a plurality of financial instruments, said method further comprising:
for each said financial instrument traded between said first party and said second party,
storing a first set of mutual put requirements established by said first party for trades with said second party, and
storing a second set of mutual put requirements established by said second party for trades with said first party,
whereby each said financial instrument traded between said first party and said second party may have different bilateral mutual put requirements.

8. The method of claim 1 wherein said mutual put requirements comprise:
a first look for exercising said option to unwind said financial instrument.

9. The method of claim 8 wherein said mutual put requirements further comprise:
a minimum period after said first look for exercising said option to unwind said financial instrument.

10. The method of claim 8 wherein said mutual put requirements further comprise:
a maximum period after said first look for exercising said option to unwind said financial instrument.

11. The method of claim 10 wherein said calculation of said set of mutual put parameters comprises:
calculating the minimum of (said first look of said first set of mutual put parameters and said first look of said second set of mutual put parameter); and
calculating the minimum of (said maximum period of said first set of mutual put requirements and said maximum period of said second set of mutual put requirements).

12. The method of claim 10 wherein said mutual put requirements further comprise:
a last time for exercising said option to unwind said financial instrument.

13. The method of claim 9 wherein said calculation of said set of mutual put parameters comprises:
calculating the minimum of (said first look of said first set of mutual put parameters and said first look of said second set of mutual put parameter); and
calculating the maximum of (said minimum period of said first set of mutual put requirements and said minimum period of said second set of mutual put requirements).

14. The method of claim 1 further comprising:
generating a report of mutual put parameters for trades entered into by said first party.

15. A method, with the aid of a computer system, of enforcing mutual put credit requirements for the trading of financial instruments between at least a first party and a second party, the mutual puts having an option by at least one said party to unwind said financial instrument in the future, comprising:

storing a first set of mutual put requirements associated with said first party for trades with said second party;

storing a second set of mutual put requirements associated with said second party for trades with said first party;

at least one of said first set of mutual put requirements and said second set of mutual put requirements requiring the ability to unwind said financial instrument in the future;

receiving a trade indication identifying said first party and said second party, said trade indication further including a negotiated set of mutual put parameters; and verifying that said negotiated set of mutual put parameters satisfy said first set of mutual put requirements and said second set of mutual put requirements.

16. A system for enforcing mutual put requirements among at least a first party and a second party trading at least one financial instruments, the mutual puts having an option by at least one said party to unwind said financial instrument in the future, comprising:

a database, said database storing:

a first set of mutual put requirements established by said first party for trades with said second party; and a second set of mutual put requirements established by said second party for trades with said first party;

at least one of said first set of mutual put requirements and said second set of mutual put requirements requiring the ability to unwind said financial instrument in the future;

an interface adapted to receive a trade indication from a trading system, said trade indication identifying said first party and said second party; and a server coupled to said interface and said database, said server adapted to receive said trade indication from said interface, said server further adapted to calculate a set of mutual put parameters, said calculation based on said first set and said second set of mutual put requirements.

17. The system of claim 16 further comprising:

a display terminal associated with at least one of said first party and said second party;

said server further adapted to display a confirmation screen on said display terminal.

18. The system of claim 16 wherein said first set of mutual put requirements and said second set of mutual put requirements are stored in said database as a two dimensional table of calculated mutual put parameters.

* * * * *